US012548635B2

United States Patent

(12) United States Patent
Rosenbusch et al.

(10) Patent No.: US 12,548,635 B2
(45) Date of Patent: Feb. 10, 2026

(54) DATA PROCESSING DEVICE AND METHOD FOR STORING DATA

(71) Applicant: Infineon Technologies AG, Neubiberg (DE)

(72) Inventors: Jens Rosenbusch, Munich (DE); Thiyagu Loganathan, Baldham (DE); Rainer Menes, Fürstenfeldbruck (DE); Dominik Langen, Eching (DE)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 18/424,933

(22) Filed: Jan. 29, 2024

(65) Prior Publication Data

US 2024/0265988 A1 Aug. 8, 2024

(30) Foreign Application Priority Data

Feb. 2, 2023 (DE) ..................... 10 2023 102 579.1

(51) Int. Cl.
*G11C 29/42* (2006.01)

(52) U.S. Cl.
CPC .................................... *G11C 29/42* (2013.01)

(58) Field of Classification Search
CPC . G11C 29/42; G11C 2029/0411; G11C 29/52; G06F 11/1044
See application file for complete search history.

(56) References Cited

U.S. PATENT DOCUMENTS 8,972,824 B1 * 3/2015 Northcott ............... G11C 29/52 714/773
9,442,839 B1 * 9/2016 Sharma .................. G11C 29/76
9,472,261 B1 * 10/2016 Chun ...................... G11C 29/36
2004/0268104 A1 * 12/2004 Cooper ............... G06F 15/7821 712/245
2007/0079212 A1 * 4/2007 Har-Chen ........... G06F 11/1044 714/758
2010/0037117 A1 * 2/2010 Pescatore ............. H03M 13/27 714/752
2013/0111122 A1 * 5/2013 Song ................... G06F 13/1647 711/147
2017/0269992 A1 * 9/2017 Bandic ................ G06F 11/1048
2018/0210787 A1 * 7/2018 Bains .................... G11C 11/409
2020/0409579 A1 * 12/2020 Mehta .................. G06F 3/0659
2021/0141692 A1 5/2021 Agarwal et al.

* cited by examiner

*Primary Examiner* — Steve N Nguyen
(74) *Attorney, Agent, or Firm* — Eschweiler & Potashnik, LLC

(57) ABSTRACT

According to various embodiments, a data processing device is described, comprising a data processing circuit, a memory, configured to store data in form of multiple pages, each page comprising a plurality of data words, a memory controller and a memory interface circuit, configured to store, for each page, user data in multiple data words of the page and error checking code bits for the multiple data words in one or more additional data words of the page, wherein, for at least some of the multiple additional data words, the error checking code bits are included in the same additional data word.

22 Claims, 6 Drawing Sheets

$$1\,Page = 7 \times \{8 \times [256 + (22 + 10)]\} + 256$$

200
204
202
Memory
206
207
203
Memory controller
208
205
Bridge
201
CPU

501
Complete Read
DATA
ECC
CS
GCS
Page
16384+
Burst Read 256
RED 22+10
GSC
Burst read Data BR
Redundancy RED
Global Security GSC
Read word 0
Read word 1
Read word 7
Read word 8
Read word 9
Read word 48
Read word 55

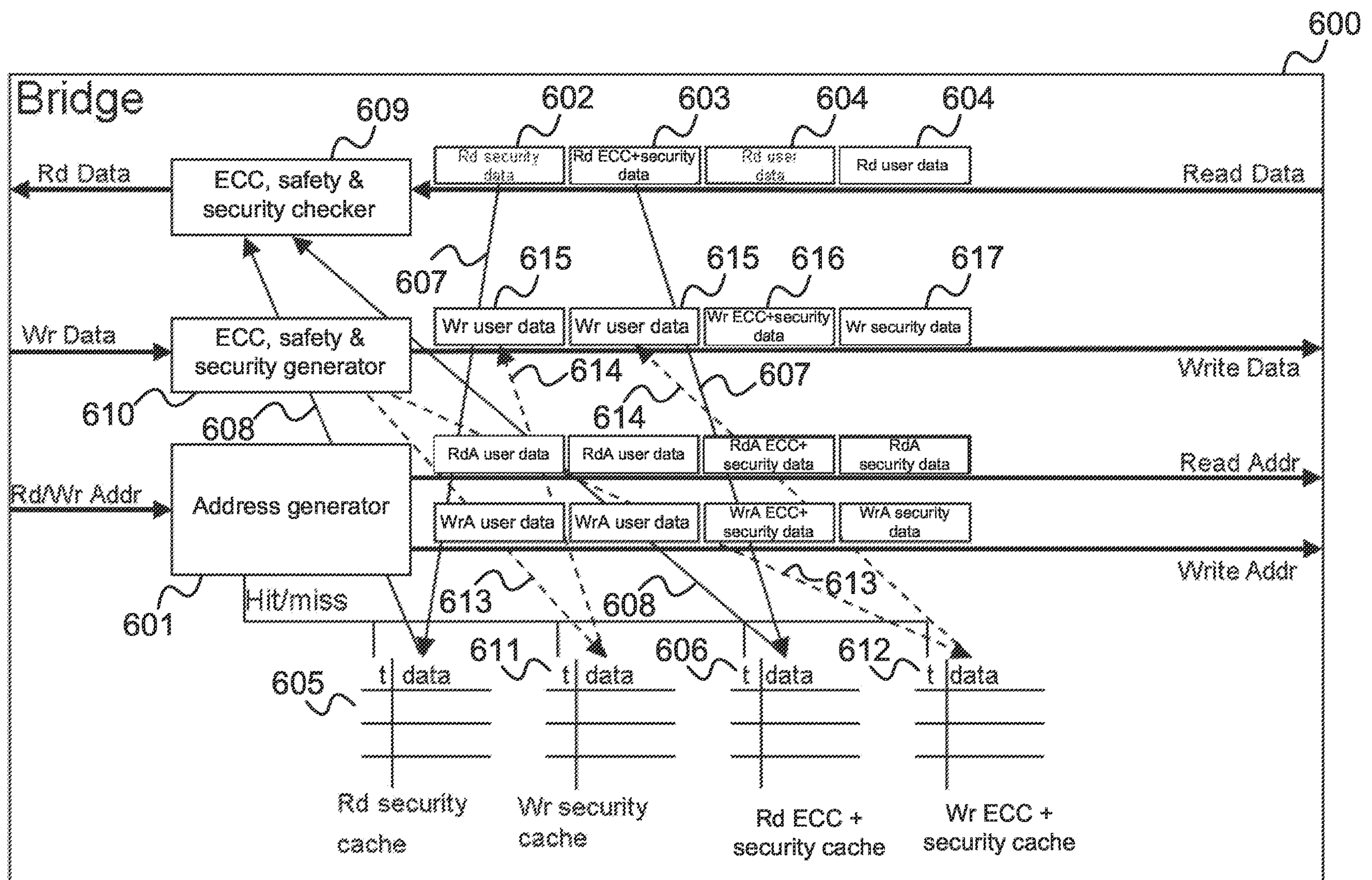
FIG 6
600
Bridge
609
602
603
604
604
Rd Data
ECC, safety & security checker
Rd security data
Rd ECC+security data
Rd user data
Rd user data
Read Data
607
615
615
616
617
Wr Data
ECC, safety & security generator
Wr user data
Wr user data
Wr ECC+security data
Wr security data
Write Data
614
607
610
608
614
RdA user data
RdA user data
RdA ECC+ security data
RdA security data
Read Addr
Rd/Wr Addr
Address generator
WrA user data
WrA user data
WrA ECC+ security data
WrA security data
Write Addr
613
601
Hit/miss
613
608
611
606
612
605
t
data
Rd security cache
Wr security cache
Rd ECC + security cache
Wr ECC + security cache

DATA PROCESSING DEVICE AND METHOD FOR STORING DATA

REFERENCE TO RELATED APPLICATIONS

This application claims priority to German Patent Application 10 2023 102 579.1, filed on Feb. 2, 2023, the contents of which are hereby incorporated by reference in their entirety.

FIELD

The present disclosure relates to data processing devices and methods for storing data.

BACKGROUND

In data processing devices which perform safety and/or security-related tasks, such as control units for a vehicle, safety and security need in particular to be ensured when storing data in a memory.

SUMMARY

According to various embodiments, a data processing device is provided that includes a data processing circuit, a memory, a memory controller, and a memory interface circuitry. The memory is configured to store data in form of multiple pages, each page including a plurality of data words. The memory interface circuit, is configured to store, for each page, user data in multiple data words of the page and error checking code bits (and possibly additional redundancy bits for security) for the multiple data words in one or more additional data words of the page, wherein, for at least some of the multiple additional data words, the error checking code bits are included in the same additional data word.

According to a further embodiment, a method for storing data according to the data processing device described above is provided.

BRIEF DESCRIPTION OF THE DRAWINGS

In the drawings, similar reference characters generally refer to the same parts throughout the different views. The drawings are not necessarily to scale, emphasis instead generally being placed upon illustrating the principles of the invention. In the following description, various aspects are described with reference to the following drawings, in which:

FIG. 6 shows the working principle of an example bridge according to an embodiment.

DETAILED DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

One approach for ensuring safety and security in data processing devices is to store, in addition to user data, redundancy bits, such as error checking code bits and other redundancy bits for safety and/or security mechanisms. However, this creates overhead for the storage and for the access to the memory. Therefore, efficient approaches for storing data provided with error checking code bits and possibly further redundancy bits are desirable.

A typical situation in a data processing device is that a data processing circuit or data processing unit, typically a processor such as a central processing unit (CPU), accesses a memory which is controlled by a controller of the memory. Such a scenario is illustrated in FIG. 1.

Figure 1:
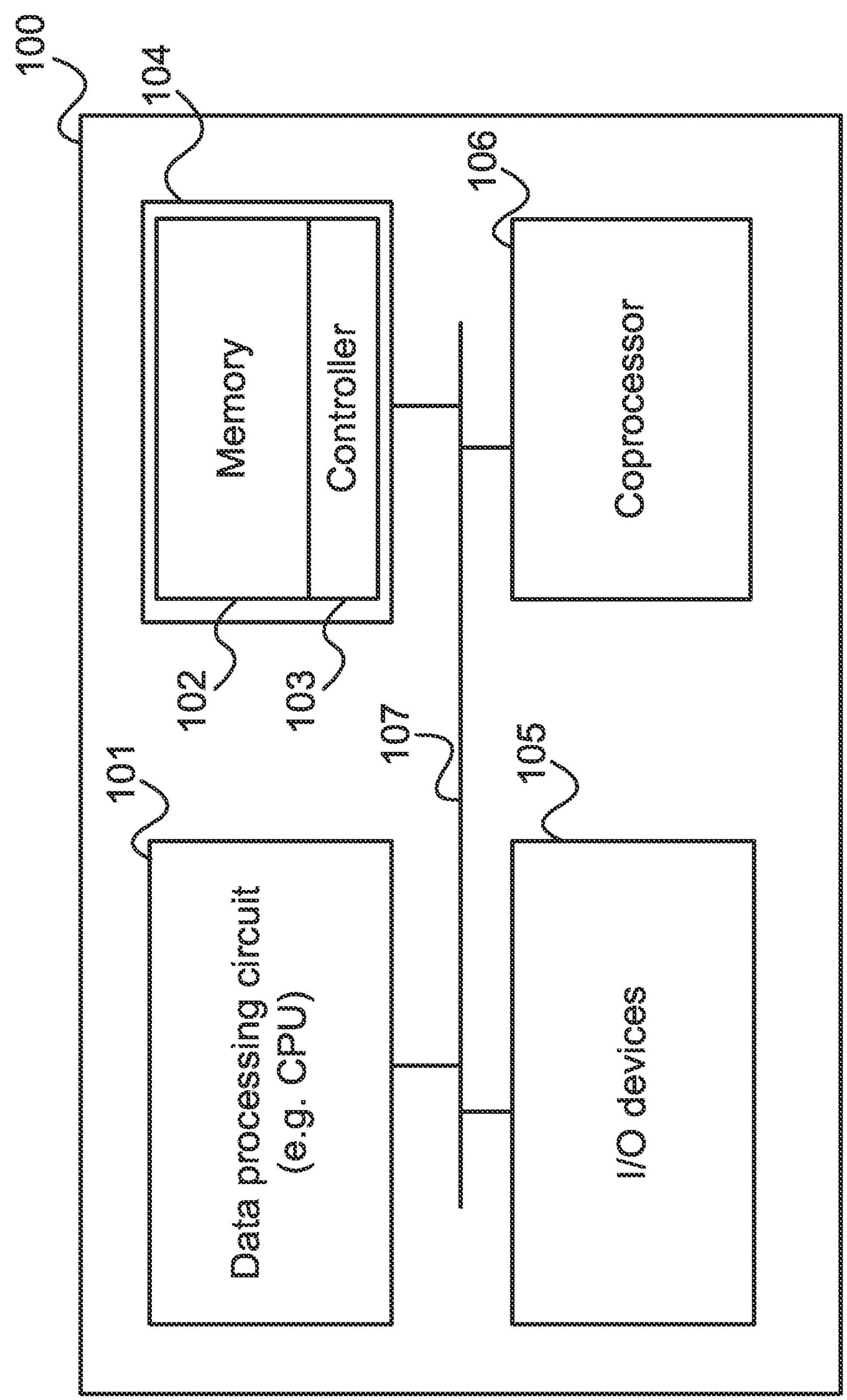
FIG. 1 shows an example data processing device.

FIG. 1 shows an example data processing device 100, such as a computer, a control unit, e.g. in a vehicle, a system-on-chip (SoC), a smart card (of any form factor), an embedded system etc.

The data processing device 100 comprises a data processing circuit 101, such as a CPU. The data processing device 100 further comprises a memory 102 controlled by a memory controller 103 and possible further components such as one or more I/O interfaces 105, one or more coprocessors 106, and so on. The memory 102 and the controller 103 form a memory arrangement 104. It should be noted that this does not necessarily mean that the memory 102 and the controller 103 are on the same chip.

The memory 102 may be a volatile memory, for example a DRAM (Dynamic Random Access Memory) or a non-volatile memory such as a (NAND or NOR) flash memory. In the following, it is assumed that the memory 102 is paged-based, i.e. the memory 102 is configured to store data in form of multiple pages, each page comprising a plurality of data words, and changing access from data located in one memory page to data located in another memory page takes longer than changing access to data located in the same memory page.

The data processing circuit 101 and the memory arrangement 104 and possibly the further components 105, 106 are connected by an interconnect 107, e.g. a network-on-chip or a bus. The data processing circuit 101 and the memory arrangement 104 may have corresponding interfaces to access and communicate via the interconnect 107.

The memory arrangement 104 may be implemented on the same chip as the data processing circuit 101, i.e. the memory controller 103 and the memory 102 may be on-chip (like for an SRAM (static random access memory) and an embedded NVM (non-volatile memory)). In that case, the interconnect 107 may be a chip-internal interconnect. Alternatively, a bus controller is on-chip and then the memory arrangement 104 is off-chip. According to another use case the (e.g. DRAM) controller 103 is on-chip and the (e.g. DRAM) memory 102 is off-chip. In that case the interconnect 107 would be internal and there would be another connection/bus between memory and controller. This connection would go off-chip.

In security-related applications, such as when the data processing device 100 is a control unit of a vehicle, it is important that memory accesses, e.g. by a CPU 101 to the memory 102 are safe (e.g. according to ASIL C/D) and secure (i.e. have cybersecurity properties such as confidentiality, integrity and availability). An inline ECC (error correction code) solution may for example provide a standardized interface with up to ASIL B safety, but no cybersecurity, so an additional mechanism is needed. However, it is also desirable that mechanisms implemented to achieve safety and security are efficient, i.e. require little extra memory and circuitry (in contrast for example to an approach involving memory duplication and an approach providing an extra device to provide redundancy) and lead to little delay (e.g. do not require a long startup time of a memory for validation).

In view of the above, according to various embodiments, a bridge (also referred to as memory interface circuit) is arranged between the entity accessing the memory (e.g. CPU 101 accessing memory 102) for safety, security and availability. It should be noted that the functionality of the bridge may also be integrated into the memory controller.

Figure 2:
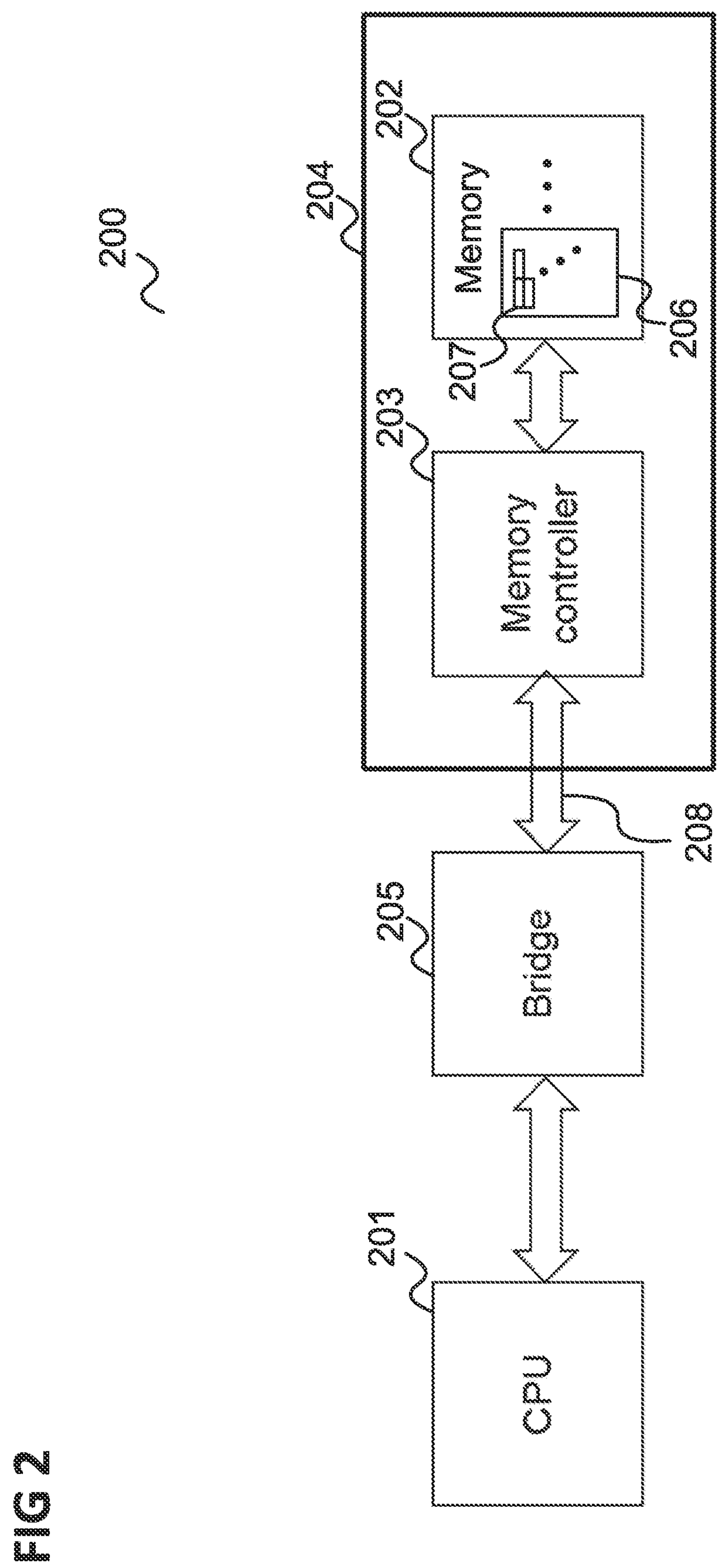
FIG. 2 shows an example data processing device according to an embodiment.

FIG. 2 shows an example data processing device 200 according to an embodiment. It may for example correspond to the data processing device 100 but comprises a bridge 205 between a CPU 201 (which may also be another data processing circuit or device such as the coprocessor 106) and a memory arrangement 204 comprising a memory controller 203 and a memory 202. The memory 202 may be an external memory with respect to a chip that implements the CPU 201 (and possibly also the bridge 205). The memory controller 203 may be any type of memory controller for the memory 202.

The bridge 205 is connected to the memory controller 203 by an interface 208, i.e. the bridge 205 may in particular be separate from the memory controller 203. Alternatively, the bridge 205 may be integrated into the memory controller 203.

As mentioned above, it is assumed that the memory 102, 202 is a page-based memory, i.e. it stores data in multiple pages 206. Each page 206 stores multiple data words 207 wherein each data word may store data bits (i.e. bits of useful data, also denoted as user data bits) but also redundancy bits for safety and security (in particular ECC bits but, according to various embodiments, further safety and security related bits).

An access to the memory 202 happens in a burst (i.e. a certain number of sub-accesses or "beats", each sub-access having a certain size (data width)). The number of sub-accesses in a burst and the sub-access size relate in particular to the interface 208 between bridge 205 and memory controller 203. The number of sub-accesses in a burst multiplied by the sub-access size gives the access size (or burst size) which is assumed to be the size (i.e. number of bits) of each data word 207. This means that the burst size (e.g. on the interconnect 107) is equal to the data word size of the memory (i.e. supported by the memory). It should however be noted that bursts between the bridge 205 and the memory controller 203 can also be larger (no negative performance impact) or smaller (in that case a read-modify-write needs to be done). The data of a burst may be transmitted sequentially or in parallel to/from the memory, depending on the width of the interface 208.

For the following example, the following sizes are assumed:

memory data width (i.e. sub-access size): 16 bits burst length (i.e. number of sub-accesses per burst): 16 page size: 2048 bytes=16384 bits=16 kbit access size (burst size, data word size): 16×16 bits=256 bit=32 byte (i.e. 16-beat-16-bit bursts)

It is further assumed that bursts are aligned to the burst size (i.e. 32-Byte aligned) and that there are no masked writes.

Figure 3:
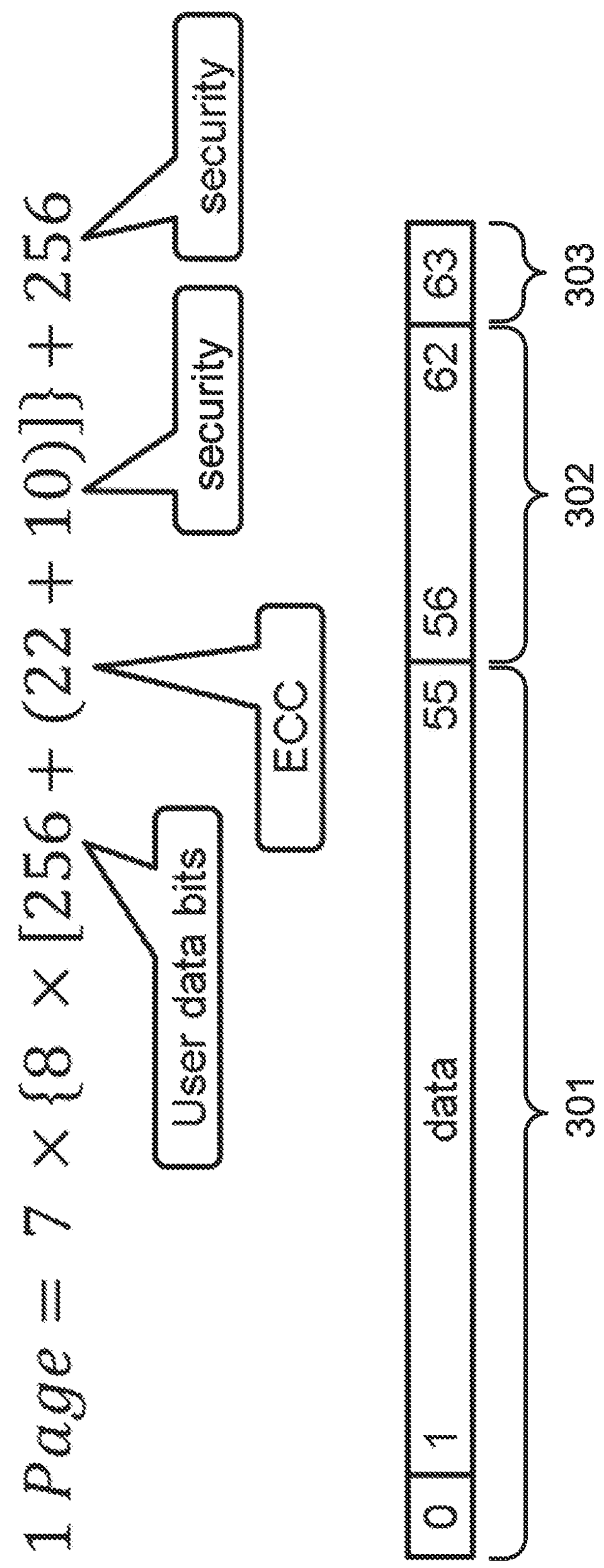
FIG. 3 illustrates an example allocation and structure of the bits of one memory page according to an embodiment.

According to various embodiments, the data of one page is structured as follows:

FIG. 3 illustrates an example allocation and structure of the bits of one memory page according to an embodiment.

Accordingly, one page holds

56×256=14336 data bits (i.e. bits for user data). This corresponds to 56 bursts 301.

56×(22+10)=56×32=1792 ECC (safety) and security bits (namely 56×22 ECC (safety) bits and 56×10 security bits). This corresponds to 7 bursts 302.

256 remaining bits for security. This corresponds to 1 burst 303.

It should be noted that the designation of bits as "safety" bits and "security" bits is only an example used for simplicity and ease of reference. In general, all of the ECC safety bits and security bits can be seen as "redundancy" bits and the redundancy bits without the ECC (safety) bits (i.e. the 56×10+256 bits) are also denoted as extra redundancy bits in the following.

The extra redundancy bits, i.e. the 56×10 security bits and the 256 security bits, may, in addition to the 56×22 ECC bits, be used for safety and security using other codes, as parity bits etc.

It can be seen that 256 bits can hold the ECC bits+10 security bits for 8×256 (user) data bits because there are 22+10=32 ECC bits+10 security bits per 256 (user) data bits. Therefore, according to various embodiments, every 256 bit of user data bits are stored in a data word 207 and for every 8 of such "user data words" (i.e. data words storing only user data words), a data word (denoted as "ECC+security data word") is used to store the ECC+security bits for the 8 user data words.

Thus, the ECC bits+10 security bits for 8 user data words may be read in a single memory access.

Figure 4:
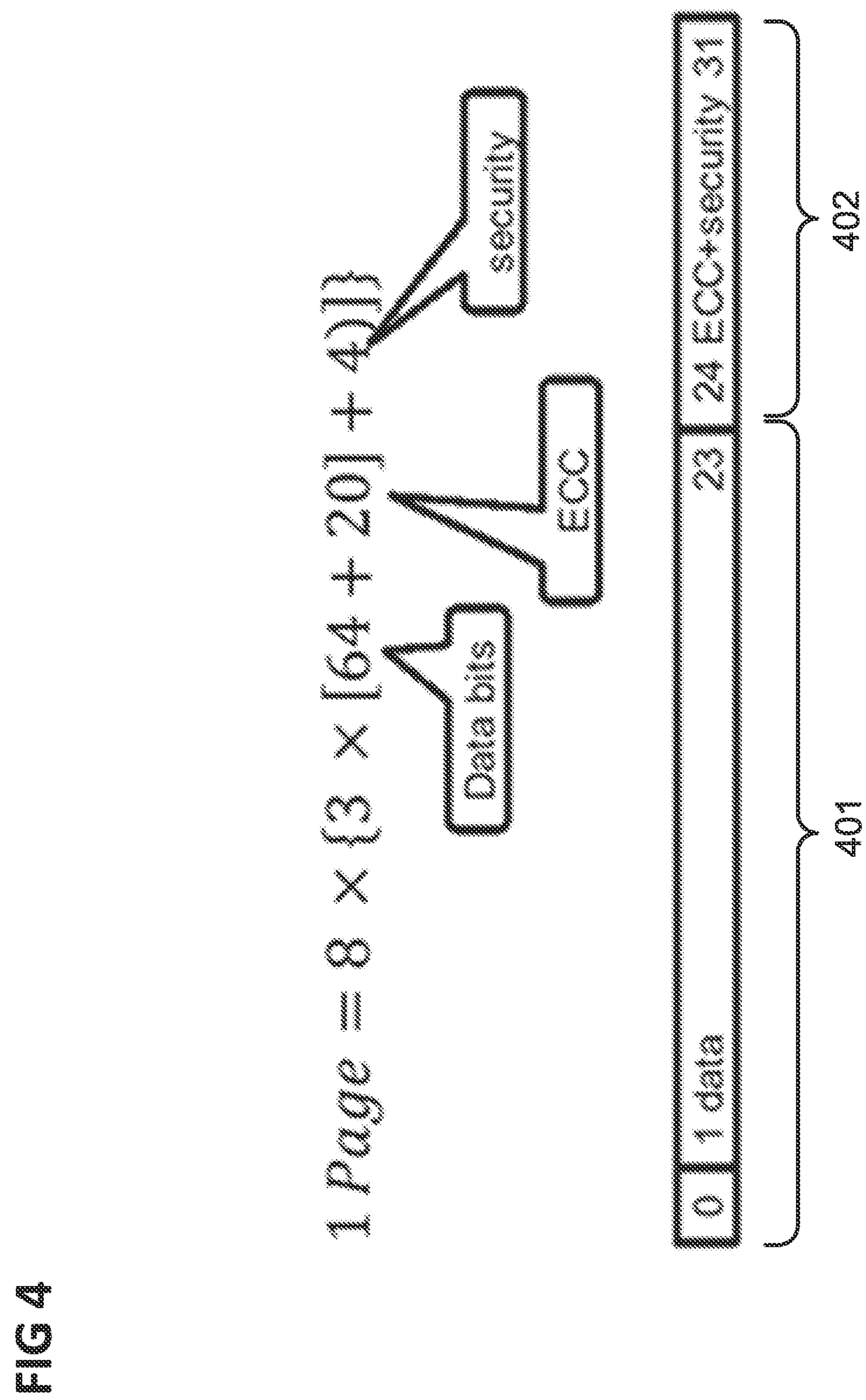
FIG. 4 illustrates an example allocation and structure of the bits of one memory page according to another embodiment

FIG. 4 illustrates an example allocation and structure of the bits of one memory page according to another embodiment.

In the example of FIG. 4, the following sizes are assumed:

memory data width (i.e. sub-access size): 8 bits burst length (i.e. number of sub-accesses per burst): 8 bits page size: 2048 bits access size (burst size, data word size): 8×8 bit=64 bit (i.e. 8-beat-8-bit bursts)

According to FIG. 4, one page holds

8×3×64=1536 data bits (i.e. bits for user data). This corresponds to 24 bursts 401.

8×3×20+8×4=512 ECC (safety) and security bits (namely 8×3×20 ECC (safety) bits and 8×4 security bits). This corresponds to 8 bursts 402.

As above, it should be noted that the designation of bits as "safety" bits and "security" bits is only an example used for simplicity and ease of reference.

Figure 5:
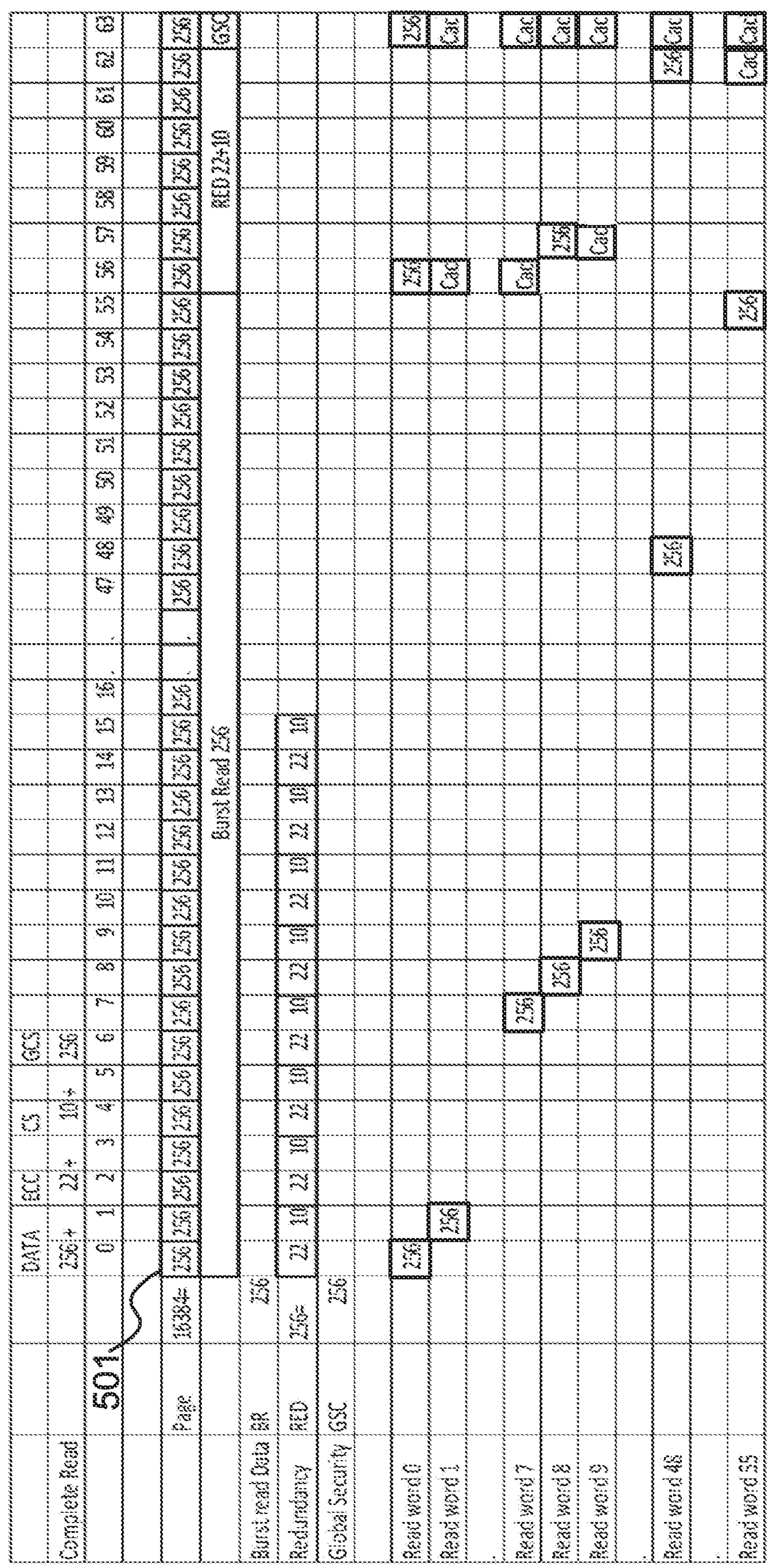
FIG. 5 illustrates an example reading of data from a memory according to an embodiment.

FIG. 5 illustrates an example reading of data from a memory according to an embodiment.

The example of FIG. 5 corresponds to the example given above, i.e. a data word (ECC+security data word) stores the ECC bits+10 security bits for 8 (user) data words.

As described with reference to FIG. 3, a page 501 contains 56 user data words (words 0 to 55), 56/8=7 ECC+security or ("redundancy") data words (words 56 and 62) and a "(global) security data word" holding the remaining 256 bits (word 63).

In the example of FIG. 5, when (e.g. before) a user data word of a page is read, the ECC+security data word holding the ECC bits+security bits for that user data word (and the following 7 user data words) is read and the security data word of that page is read. The ECC+security data word is cached (indicated with “Cac” in FIG. 5) until the following 7 user data words have also been read. In the present example as illustrated, the security data word is cached until the whole page has been read. In the general case, there may be writes or reads of fewer words to/from a page (e.g. just single words may be read from a page).

For example, when reading (user) data word 0, the (ECC+security) data word 56 is read and cached until (user) data word 8 is read. Then, (ECC+security) data word 57 is read and so on. Further, when reading (user) data word 0, the security data word 63 is read and cached until the whole page (i.e. data word 55) has been read.

The writing (i.e. storing) of data to the memory is carried out analogously.

According to various embodiments, the bridge 205 takes care of the caching, generation of safety and security bits (when writing to memory 202) and checking of safety and security bits (when reading from memory 202). An example of this is described in more detail with reference to FIG. 6.

FIG. 6 shows a bridge 600 according to an embodiment (e.g. corresponding to the bridge 205 of FIG. 2).

In a read data path, as described above, when beginning to read from a page, the security data word 602 and the ECC+security data word 603 is read, followed by user data words 604 (eight until the next ECC+security data word is read). The security data word 602 is cached in a read security data cache 605 (and kept for the whole page) and the ECC+security data word 603 is cached in a read ECC and security data cache 606 (and kept (at least) for the eight data words) as indicated by arrows 607. The caches used (in particular the read ECC and safety data cache 606) may also be larger, i.e. have multiple entries (for, in case of the read ECC and security data cache 606, multiple ECC+security data words). This means that the read ECC and security cache 606 can also cache data of previous ECC+security data words in case they are needed in the future again.

The cached data is accessed (as indicated by arrows 608) by an ECC, safety and security data checker 609 which performs data checking for safety and security for the read data (such as ECC checking and further checking depending on the usage of the extra redundancy bits). So, when reading, the read caches 605, 606 are filled with ECC, safety and security information and the ECC, safety and security data checker 609 uses this information for payload checking.

Analogously, when writing, an ECC, safety and security information generator 610 generates security and safety information (i.e. redundancy bits) and stores it in a write security cache 611 and a write ECC+security cache 612, respectively (as indicated by arrows 613) until they have been completely generated for a page or a set of eight user data words, respectively. After that, it is written (i.e. put on the write path, as indicated by arrows 614). It should be noted that the redundancy bits are written at some point in time, but not necessarily directly after the write security cache 611 and the write ECC+security cache 612, respectively, have been filled completely. As caches are used, they may be written to memory later, e.g. redundancy bits may be written when the cache line used for them gets replaced. This means that the ECC, safety and security information generator 610 updates the write caches 611, 612 while payload data is coming in. In the illustration of FIG. 6, user data words 615 are written, a ECC+security data word 616 is written (containing the ECC+security information for the preceding eight user data words 615) and a security data word 617 is written containing the security information for the page. The security data word 617 is written in accordance with the cache replacement policy. It may be written when the end of the page is reached but in general the security data word 617 and the ECC+security data word 616 can be written to memory at a later point in time. This allows avoiding intermediate writes in case that at a later point in time the same security data word 617 and/or ECC+securityS data word 616 is written again.

The bridge 600 further comprises an address generator 618 which generates, for each data word to be read or written the correct address of the data word in memory. In particular, it generates the memory address of an ECC+security data word when it should be read or written and of a security data word when it should be read or written. The addresses of the payload data are recalculated according to the protection scheme.

In the above, a complete reading and writing of a page has been described. However, a page may also be only partially read or written. Reading and writing of user data words and ECC+security data words that are not needed may then be simply omitted. The addresses generated by the address generator 601 may in particular be used to determine whether there is a cache hit or miss (e.g. whether the read ECC+security cache includes the ECC and security information for a data word that should be read).

Further, it should be noted that data words may also be read before the safety and/or security information which relates to them by buffering them until the safety and/or security information has been read and then performing the checking (and vice versa when writing).

It should be noted that while in the above examples, an error correction code was used (and therefore the corresponding bits were referred to as error correction code (ECC) bits), an error detection code may also be used (so that the error correction code bits are error detection code bits instead). The terms “error checking code” and “error checking code bits” are used to include both of these possibilities.

In summary, according to various embodiments, a data processing device is provided comprising a data processing circuit (e.g. corresponding to CPU 201), a memory (e.g. corresponding to memory 202), configured to store data in form of multiple pages, each page comprising a plurality of data words, a memory controller (e.g. corresponding to memory controller 203) and a memory interface circuit (e.g. corresponding to bridge 205), configured to store, for each page, user data in multiple data words of the page and error checking code bits for the multiple data words in one or more additional data words of the page, wherein, for at least some of the multiple additional data words, the error checking code bits are included in the same additional data word.

It should be noted that the memory controller and the memory interface circuit (i.e. the bridge in the examples described above) can be integrated into one circuit or functional unit (this functional unit may then actually be seen as memory controller with integrated memory interface circuit). In other words, the memory controller and the memory interface circuit do not necessarily have to be two separate circuits. They may, however, be implemented as separate functional elements connected, e.g. via an interconnect like illustrated in FIG. 2.

According to various embodiments, in other words, a memory interface circuit is provided between a data processing circuit and a memory which aggregates the error checking code bits of multiple data words holding user data and puts them together in one or more additional data words.

This allows efficient memory accesses and memory usage, in particular with respect to having redundancy information for ensuring safety and security.

Various Examples are described in the following:

Example 1 is a data processing device, comprising a data processing circuit, a memory, configured to store data in form of multiple pages, each page comprising a plurality of data words, a memory controller and a memory interface circuit, configured to store, for each page, user data in multiple data words of the page and error checking code bits for the multiple data words in one or more additional data words of the page, wherein, for at least some of the multiple additional data words, the error checking code bits are included in the same additional data word.

Example 2 is the data processing device of example 1, wherein the memory interface circuit is further configured to store additional redundancy bits for the multiple data words in the one or more additional data words.

Example 3 is the data processing device of example 2, wherein the one or more additional data words are completely filled with the error checking code bits for the multiple data words and the additional redundancy bits for the multiple data words.

Example 4 is the data processing device of any one of examples 1 to 3, wherein the multiple additional data words are free from user data bits.

Example 5 is the data processing device of any one of examples 1 to 4, wherein the memory interface circuit is further configured to store further redundancy bits in at least one further data word of the page.

Example 6 is the data processing device of example 5, wherein the at least one further data word is free from user data.

Example 7 is the data processing device of any one of examples 1 to 6, wherein each page consists of the same number of data words which all have the same size.

Example 8 is the data processing device of example 8, wherein the data word size is equal to a burst size of a memory burst access supported by the memory.

Example 9 is the data processing device of any one of examples 1 to 8, wherein the memory interface circuit is configured to store, for each page, and each set of a plurality of sets of multiple data words of the page, user data in the multiple data words of the set and error checking code bits for the multiple data words in one or more additional data words associated with the set, wherein, for at least some of the multiple additional data words, the error checking code bits are included in the same additional data word.

Example 10 is the data processing device of example 9, wherein the memory interface circuit is further configured to store, for each set of the plurality of sets, additional redundancy bits for the multiple data words in the one or more additional data words associated with the set.

Example 11 is the data processing device of examples 9 or 10, wherein the one or more additional data words is a single additional data word for the set and the error checking code bits for all the user data stored in the multiple data words are included in the additional data word.

Example 12 is the data processing device of any one of examples 9 to 11, wherein the number of additional data words is the same for each set.

Example 13 is the data processing device of any one of examples 9 to 12, wherein the number of sets is the maximum number such that the multiple data words of each set and the one or more additional data words associated with the sets fit into the page.

Example 14 is the data processing device of any one of examples 9 to 13, wherein the number of error checking code bits and the number of additional data words is such that for each page, the number of bits which are not part of the multiple data words of any set of the page and the one or more additional data words of any of set of the page is equal to or an integer multiple of the number of bits of a data word.

Example 15 is the data processing device of any one of examples 1 to 14, comprising a write error checking code bit cache, wherein the memory interface circuit is configured to, when writing the multiple data words to the memory, cache error checking code bits for the multiple data words in the write error checking code bit cache at least until the error checking code bits have been generated for all of the multiple data words and then write the error checking code bits into the one or more additional data words.

Example 16 is the data processing device of example 15, wherein the memory interface circuit is further configured to, when writing the multiple data words to the memory, cache additional redundancy bits for the multiple data words in the write error checking code bit cache at least until the additional redundancy bits have been generated for all of the multiple data words and then write the additional redundancy bits into the one or more additional data words.

Example 17 is the data processing device of any one of examples 1 to 16, comprising a write redundancy bit cache, wherein the memory interface circuit is configured to, when writing the multiple data words to the memory, cache further redundancy bits for the multiple data words in the write redundancy bit cache at least until the further redundancy bits have been generated for all of the multiple data words and then write the further redundancy bits to the memory.

Example 18 is the data processing device of any one of examples 1 to 17, comprising a read error checking code bit cache wherein the memory interface circuit is configured to, when reading the multiple data words from the memory, read the one or more multiple additional data words and cache the error checking code bits in the read error checking code bit cache at least until error correction has been performed for all of the multiple data words.

Example 19 is the data processing device of example 18, wherein the memory interface circuit is further configured to, when reading the multiple data words from the memory, read the one or more multiple additional data words and cache additional redundancy bits from the one or more multiple additional data words in the read error checking code bit cache.

Example 20 is the data processing device of any one of examples 1 to 19, comprising a read redundancy bit cache, wherein the memory interface circuit is further configured to, when reading the multiple data words from the memory, cache further redundancy bits in the read redundancy bit cache.

Example 21 is a method for storing data in a memory, wherein the memory stores data in form of multiple pages, each page comprising a plurality of data words and wherein the method comprises storing, for each page, user data in multiple data words of the page and error checking code bits for the multiple data words in one or more additional data words of the page, wherein, for at least some of the multiple additional data words, the error checking code bits are included in the same additional data word.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

REFERENCE SIGNS

100 data processing device
101 data processing circuit
102 memory
103 memory controller
104 memory arrangement
105 I/O devices
106 coprocessor
107 interconnect
200 data processing device
201 CPU
202 memory
203 memory controller
204 memory arrangement
205 bridge
206 page
207 data words
208 interface
301 user data bit words
302 ECC+security bit words
303 security bit words
401 user data bit words
402 ECC+security bit words
501 page
600 bridge
601 address generator
602 security data word
603 ECC+security data word
604 user data word
605 read security data cache
606 read ECC+security cache
607, 608 arrows
609 ECC, safety and security (data) checker
610 ECC, safety and security (data) generator
611 write security cache
612 write ECC+security cache
613, 614 arrows
615 user data words
616 ECC+security data word
617 security data word

What is claimed is:

1. Data processing device, comprising:

a data processing circuit;

a memory, configured to store data in the form of multiple pages, each page comprising a plurality of data words;

a memory controller; and a memory interface circuit, configured to store, for each page, user data in multiple data words of the page, error checking code bits and security bits for the multiple data words in one or more additional data words of the page, and security bits for the page in a security data word, wherein the data word size is equal to a burst size of a memory burst access supported by the memory, wherein error checking code bits for each set of n data words are included in the same additional data word and the memory controller is configured to, when reading one or more data words stored in a page, read and cache the security data word for the page;

for each set of n data words that includes at least one of the one or more data words, read and cache an additional data word that stores error checking code bits and security bits for the set of data words; and read the at least one of the one or more data words based on the additional data word and the security data word.

2. The data processing device of claim 1, wherein the one or more additional data words are completely filled with the error checking code bits for the multiple data words and the security bits for the multiple data words.

3. The data processing device of claim 1, wherein the one or more additional data words are free from user data bits.

4. The data processing device of claim 1, wherein the security data word is free from user data.

5. The data processing device of claim 1, wherein each page comprises the same number of data words which all have the same size.

6. The data processing device of claim 1, comprising a write error checking code bit cache, wherein the memory interface circuit is configured to, when writing n data words to the memory, cache error checking code bits for the n words in the write error checking code bit cache until the error checking code bits have been generated for the n data words and then write the error checking code bits into the additional data word.

7. The data processing device of claim 6, wherein the memory interface circuit is further configured to, when writing the n data words to the memory, cache security bits for the n data words in the write error checking code bit cache until the security bits have been generated for all of the n data words and then write the security bits into the additional data word.

8. The data processing device of claim 6, comprising a write redundancy bit cache, different from the write error checking code bit cache, wherein the memory interface circuit is configured to cache the security bits for the page.

9. The data processing device of claim 1, comprising a read error checking code bit cache configured to store the error checking code bits for the n data words in a set.

10. The data processing device of claim 9, wherein the read error checking code bit cache is configured to store the security bits for the n data words in a set.

11. The data processing device of claim 9, comprising a read redundancy bit cache, different from the read error checking code bit cache, configured to store the security bits for the page.

12. The data processing device of claim 1, wherein the memory controller is configured to cache the additional data words during reading of data words not associated with the additional data words.

13. A method for storing data in a memory, wherein the memory stores data in the form of multiple pages, each page comprising a plurality of data words and wherein the method comprises storing, for each page, user data in multiple data words of the page, error checking code bits and security bits for the multiple data words in one or more additional data words of the page, and security bits for the page in a security data word, wherein the data word size is equal to a burst size of a memory burst access supported by the memory, wherein error checking code bits for each set of n data words are included in the same additional data word; and reading one or more data words stored in a page by reading and caching the security data word for the page;

for each set of n data words that includes at least one of the one or more data words, reading an additional data word that stores error checking code bits and security bits for the set of data words; and reading the at least one of the one or more data words based on the additional data word and the security data word.

14. The method of claim 13, wherein the one or more additional data words are completely filled with the error checking code bits for the multiple data words and the security bits for the multiple data words.

15. The method of claim 13, wherein the one or more additional data words are free from user data bits.

16. The method of claim 13, wherein the security data word is free from user data.

17. The method of claim 13, comprising, when writing n data words to the memory, caching error checking code bits for the n words in a write error checking code bit cache until the error checking code bits have been generated for the n data words and then writing the error checking code bits into the additional data word.

18. The method of claim 17, comprising, when writing the n data words to the memory, caching security bits for the n data words in the write error checking code bit cache until the security bits have been generated for all of the n data words and then writing the security bits into the additional data word.

19. The method of claim 17, comprising caching the security bits for the page in a write redundancy bit cache, different from the write error checking code bit cache.

20. The method of claim 13, comprising caching the error checking code bits for the n data words in a set in a read error checking code bit cache.

21. The method of claim 20, comprising caching the security bits for the n data words in a set in the read error checking code bit cache.

22. The method of claim 20, comprising caching the security bits for the page in a read redundancy bit cache, different from the read error checking code bit cache.

* * * * *